United States Patent [19]

Huthloff

[11] 4,385,526

[45] May 31, 1983

[54] FLOW METER

[75] Inventor: Eckhard Huthloff, Augsburg, Fed. Rep. of Germany

[73] Assignee: Bopp & Reuther GmbH, Mannheim-Waldhof, Fed. Rep. of Germany

[21] Appl. No.: 209,289

[22] Filed: Nov. 21, 1980

[30] Foreign Application Priority Data

Nov. 21, 1979 [DE] Fed. Rep. of Germany ....... 2946944

[51] Int. Cl.$^3$ ................................................ G01F 1/32
[52] U.S. Cl. ................................................ 73/861.22
[58] Field of Search ............ 73/861.22, 861.23, 861.24

[56] References Cited

U.S. PATENT DOCUMENTS 3,572,117  3/1971  Rodely .............................. 73/861.22
4,088,020  5/1978  Sgourakes et al. ................ 73/861.24
4,173,143 11/1979  Venton-Walters ................ 73/861.22

OTHER PUBLICATIONS

Bearman "Investigation of the Flow Behind a Two-Dimensional Model with a Blunt Trailing Edge and Fitted with a Splitter Plate" in J. Fluid Mech. vol. 21, 1965, pp. 241-247.
Yokagawa Electric "Pulse Output Measurement Device Utilizing Karman Vortex" in Society of Automatic Mechanisms 1967, pp. 389-394.
Morkovin "Flow Around Circular Cylinders" in Symposium on Fully Separated Flows 1964, p. 112.

*Primary Examiner*—Herbert Goldstein
*Attorney, Agent, or Firm*—Michael J. Striker

[57] ABSTRACT

A flow meter, especially for measuring fluid flow passing through large-diameter conduits, in which a rod-shaped vortex generating body is built in a conduit section in a direction transverse to the fluid stream passing therethrough and in which Karman vortices detach themselves, the frequency of which, which is measured by feeler elements, corresponds to the speed of the fluid passing through the conduit. In order to assure that the aforementioned vortices detach themselves uniformly over the whole length of the vortex generating body even if the flow meter is built into a conduit of large diameter, the tube section is divided by at least one thin dividing wall into two vortex chambers. The vortex generating body is arranged normal to the aforementioned dividing wall, and the feeler elements for the sensing of the vortex frequency are arranged in one of the vortex chambers.

9 Claims, 10 Drawing Figures

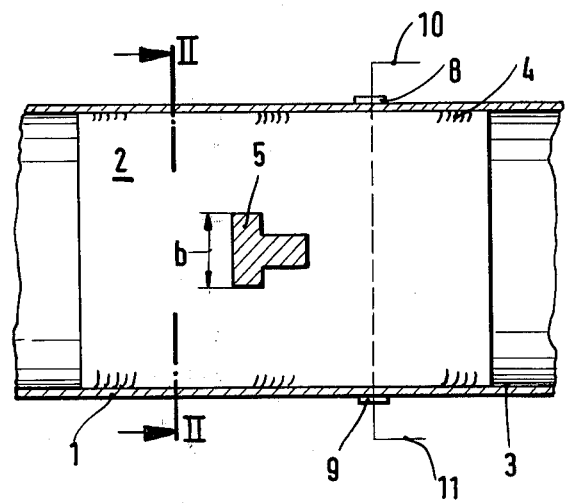
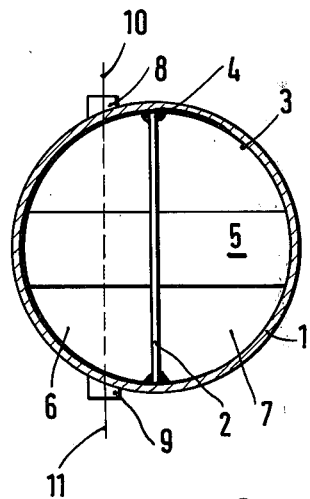
Fig.1     Fig.2
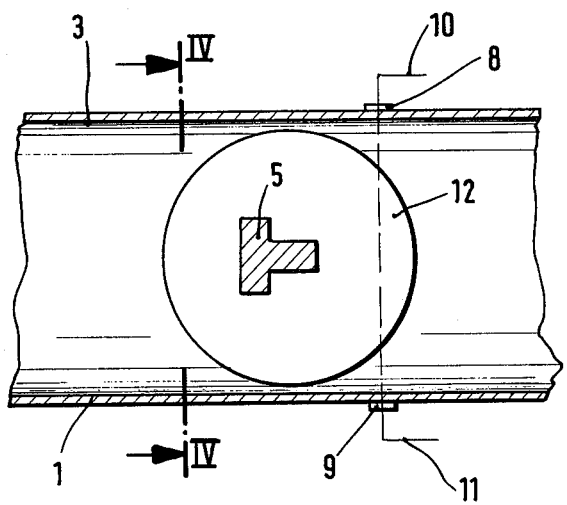
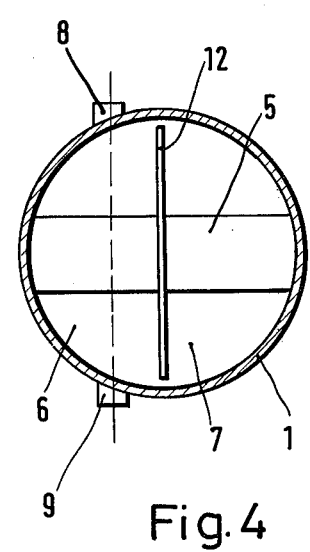
Fig.3     Fig.4

FLOW METER

BACKGROUND OF THE INVENTION

The present invention relates to a flow meter, especially for measuring fluid flow passing through large diameter conduits, in which, in a conduit section through which the fluid stream passes, a rod-shaped vortex generating body extending transverse to the direction of fluid flow is arranged, from which Karman vortices detach themselves, the frequency of which corresponds to the speed of the fluid passing through the conduit, which speed is measured by a feeler element.

In such a flow meter, which is constructed as a vortex counter, there exists between the frequency of the produced Karman vortices and the fluid flow speed the relationship $$f = S \cdot v / b$$

in which f is the vortex detaching frequency, v the speed of the fluid flow, b the characteristic width of the vortex generating body, and S the Strouhal number. The Strouhal number S is determined by the equation $$S = (f \cdot b / v),$$

wherein v is the speed of the fluid, f is the vortex frequency, and b is the width of the vortex generating body. The cross section of the vortex generating body determines the aforementioned Strouhal number, which over a wide range of fluid speed is constant, so that also the relationship between the frequency of the created Karman vortices and of the fluid stream speed is correspondingly linear. Optimum vortex signals with a high signal quality and a large linear region can be obtained by corresponding selection of the cross section of the vortex generating body in relationship to the cross section of the conduit through which the fluid passes.

As will be clear from the first of the equations above, the vortex detaching frequency drops with increasing width of the vortex generating body. If one uses, to obtain a geometric similarity during mounting of the vortex countar into conduit with increasingly larger diameter, with the same or similar cross section of the vortex generating body and the same ratio of the cross section of the body to the cross section of the conduit, then the Strouhal number will remain the same, but the frequency of the Karman vortices will drop with increasing width of the body, so that the determination of the vortex frequency will become more difficult with the increase of the diameter of the conduit. Thus, for instance, at a conduit diameter of 250 mm a satisfactory vortex signal can still be obtained, whereas at a conduit diameter of 600 mm the vortex frequency is so low that the evaluation of the same in the connected electronic computing device meets with great difficulty.

If the width b of the vortex generating body to be built into large-diameter conduits would be reduced, then according to the above equation the vortex frequency f could be increased; however, the stability of the vortex path would be endangered, since the ratio of slenderness of the vortex generating body which extends through the whole cross section of the conduit would be too great. In this case, the vortices would not detach themselves in the form of cylinders from the total length of the vortex generating body, but due to the small coupling of the fluid different detaching regions would occur in which the detachment of the vortices would not be in phase, whereby disturbing transverse streams would be formed, which would impair the quality of the signals.

SUMMARY OF THE INVENTION

It is the object of the present invention to construct a vortex counter in such a manner that during mounting of the same in conduits of large diameter sufficiently high vortex frequencies are obtained, without detrimentally affecting the ratio of slenderness of the body and therewith the measured signal.

With these and other objects in view, the flow meter according to the present invention, especially for measuring fluid flow passing through large-diameter conduits mainly comprises at least one thin dividing wall extending through a central plane of a section of the conduit and dividing the conduit sections in at least two vortex chambers, a rod-shaped vortex generating body from which Karman vortices will detach, the frequency of which corresponds to the speed of the fluid flow through the conduit, in which said body has a longitudinal axis extending substantially normal to the aforementioned dividing wall and feeler means for measuring the frequency of the Karman vortices.

The arrangement preferably comprises a single thin dividing wall arranged in a plane including the axis of the conduit and the thus resulting division of the conduit section carrying the vortex generating body into two vortex chambers, will produce in each vortex chamber a separate vortex path respectively detaching itself from each half of the vortex generating body. The ratio of slenderness which results from the length of the vortex generating body in relationship to its width, will thereby be reduced by half, so that the vortices will now detach themselves from the vortex generating body uniformly and without any phase shifting while forming stable rotation cylinders.

With vortex counters for use with conduits of large diameters, it is therefore possible to reduce the width of the vortex generating body to a half, so that the vortex detaching frequency is doubled and now sufficiently great to assure its evaluation in the electronic computer device connected thereto. A deterioration of the measuring signal, due to non-uniform vortex detachment and detrimental cross streams in the vortex paths, is avoided due to the division of the vortex generating body. The thin dividing wall creates practically no additional flow resistance; in fact, the pressure loss in the conduit section can be considerably reduced due to the attainable reduction of the width of the vortex generating body.

If instead one dividing wall extending along the axis of the conduit, a plurality of parallel dividing walls is provided in the conduit section having the vortex generating body, then it is possible to reduce the width of the vortex generating body still further, so that if the flow meter according to the present invention is used in conduits with very large diameters, a still perfect vortex detaching action with sufficiently high frequency can be obtained.

The feeler elements for the determination of the vortex frequency need only be built into one of the vortex chambers, whereas the vortex generating body extends over the whole cross section of the conduit, so that a symmetrical fluid flow in the conduit will be maintained.

The single dividing wall which extends along the axis of the conduit may be constituted by a thin rectangular plate of sheel metal, which extend over the whole height of the conduit and which divides the cross section of the conduit in the actuating region of the vortex generating body into halves. Such a sheet metal disk can be easily built into the conduit section. By arranging the vortex generating body in the middle region of the sheet metal disk, the latter is arranged in the region of the vortex detachment, so that a reciprocal action between the adjacent vortex chambers is avoided.

Since the detachment region of the vortices extends upwardly and downwardly up to the inner surface of the conduit, it is possible to use also rectangular, circular or an elliptically shaped sheet metal disk as the dividing wall, which in its height or in its diameter is smaller than the diameter of the conduit section and which is in its middle region connected to the vortex generating body. Since the sheet metal disk which is arranged in the center of the conduit, is carried by the vortex generating body, a separate connection for the disk to the wall of the conduit is not necessary.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 1 is a vertical cross section through one modification of the present invention with a single dividing wall and a vortex generating body attached thereto;

FIG. 2 is a cross section taken along the line II—II of FIG. 1;

FIG. 3 is a longitudinal cross section similar to FIG. 1, but showing a circular separating wall carried by the vortex generating body attached thereto;

FIG. 4 is the cross section taken along the line IV—IV of FIG. 3;

DESCRIPTION OF THE PREFERRED EMBODIMENTS

Figure 5:
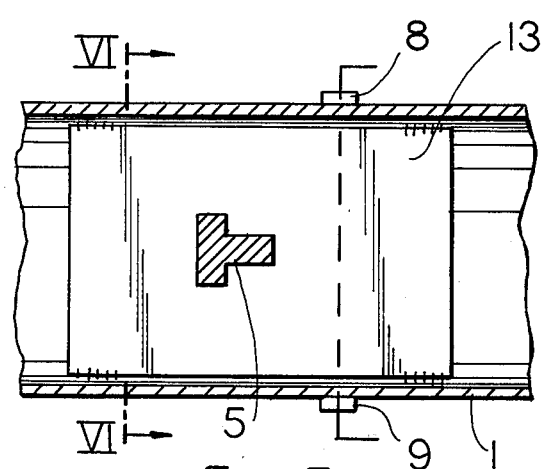
FIG. 5 is a further modification in accordance with the present invention, in which two parallel transversely spaced dividing walls are provided in the conduit section.

In the conduit section 1 illustrated in FIGS. 1 and 2, a dividing wall in the form of a thin rectangular sheet metal disk 2 is arranged extending in the longitudinal center plane of the conduit section 1 and having a height equal to the diameter of the conduit section 1, and connected at opposite longitudinal end edges by weld seams 4 or the like to the inner surface 3 of the conduit section 1. The vortex generating body 5 extends with its longitudinal axis normal to the dividing wall 2 and to opposite sides of the latter over the whole width of the conduit section 1. The conduit section 1 is divided by the dividing wall 2 into two vortex chambers 6 and 7 in which the same flow characteristics will occur, since the vortex generating body extends symmetrically to the dividing wall 2 through both vortex chambers 6 and 7.

An ultrasonic sound measuring device comprising an ultrasonic transmitter 8 and an ultrasonic sound receiver 9 as feeler element is arranged downstream of the vortex generating body 5, as considered in direction of flow of fluid passing through the conduit section 1, in the vortex chamber 6 for the scanning of the Karman vortices. A conductor 10 leading from the ultrasonic sound transmitter to a non-illustrated sound producer is connected to the feeler element 8, and a corresponding conductor 11 is connected to the element 9 and leading to the non-illustrated electronic computing device known per se in the art. The ultrasonic beam emanating from the ultrasound transmitter 8 is modulated by the vortices which detach themselves from the vortex generating body 5, and this change of the beam is received by the ultrasonic receiver 9 and a signal for the presence of a vortex is transmitted. Different feeler elements known in the art may also be used instead of the ultrasonic sound measuring device mentioned above. Such devices are for instance disclosed in the U.S. Pat. Nos. 3,680,375; 3,756,078; and 3,788,141.

The vortex generating body 5 is arranged in about the middle region of the dividing wall 2, so that the vortices produced in the vortex chambers 6 and 7 can detach themselves from the body 5 without mutual interaction. Thereby the vortex detachment is stabilized, so that the width b of the body 5 of for instance T-shaped cross section can be reduced at the same ratio of slenderness to a half, and therewith the frequency of the detaching vortices be doubled. In conduits of large diameter, a vortex frequency sufficiently high for the electronic evaluation circuitry will be obtained.

In the embodiment illustrated in FIGS. 3 and 4, there is instead a rectangular sheet metal disk 2 which extends through the whole height of the tube section 1, a circular thin sheet metal disk 12 provided, the diameter of which is smaller than the inner diameter of the conduit section 1, so that the conduit cross section is not entirely divided into halves. The diameter of the circular disk 12 is, however, large enough so that, in the region of detachment of the vortices forming in the vortex chambers 6 and 7 and in the adjacent marginal zones, the vortices are sufficiently separated from each other, so that no interaction of the vortices produced in the vortex chambers 6 and 7 will result. The circular metal sheet disk 12 can be produced in a simple manner, and this disk 12 is fixedly connected with the vortex generating body 5, the opposite ends of which are fixed in any desired manner to the inner surface of the conduit section 1.

Figure 6:
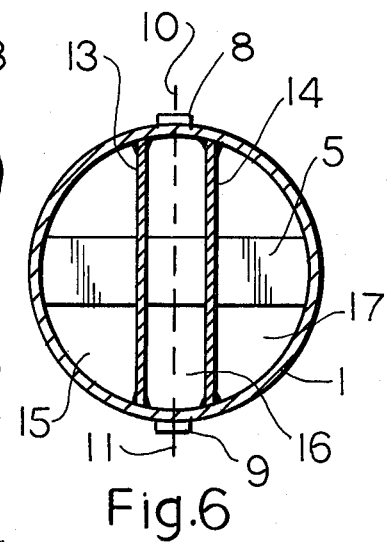
FIG. 6 is a cross section taken along the line VI—VI of FIG. 5.

In the embodiment shown in FIGS. 5 and 6, two parallel dividing walls 13 and 14 are built in the conduit section 1 so that this conduit section 1 is, in the region of the vortex generating body 5, divided into three vortex chambers 15, 16 and 17. The ultrasonic-sound-measuring ultrasonic sound transmitter 8 and ultrasonic sound receiver 9 are in this case connected to the middle vortex chamber 16.

Figure 7:
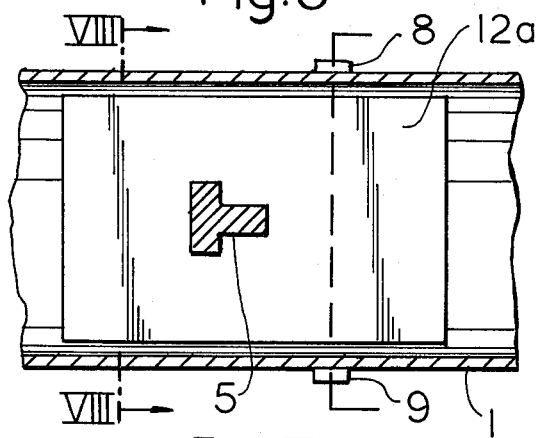
FIG. 7 is a longitudinal cross section of an additional modification according to the present invention, which includes a rectangular dividing wall having a height smaller than the diameter of the conduit section and being carried by the vortex generating body, the opposite ends being fixed to the conduit section.
Figure 8:
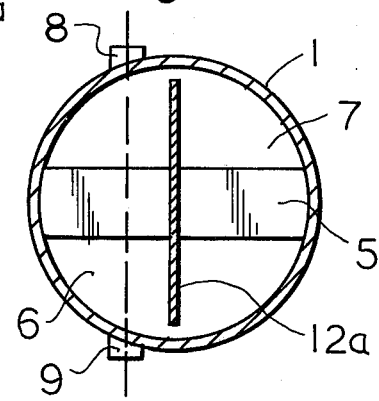
FIG. 8 is a cross section taken along the line VIII—VIII of FIG. 7.

In the embodiment shown in FIGS. 7 and 8, a dividing wall 12a of rectangular configuration is used, the height of which is slightly smaller than the diameter of the conduit section 1.

Figure 9:
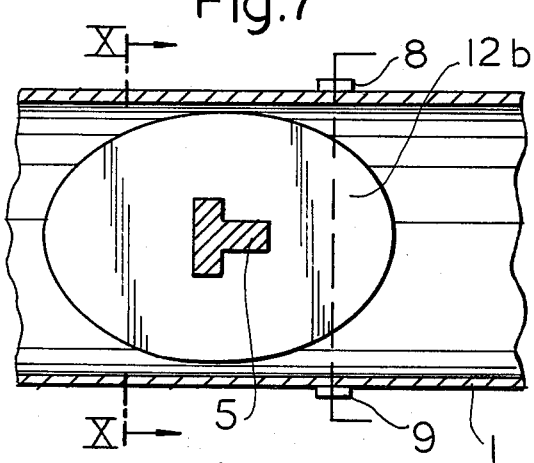
FIG. 9 is a longitudinal cross section through yet a further embodiment according to the present invention, in which the dividing wall is an elliptically shaped dividing wall having a small axis smaller than the diameter of the conduit section and being carried by the vortex generating body.
Figure 10:
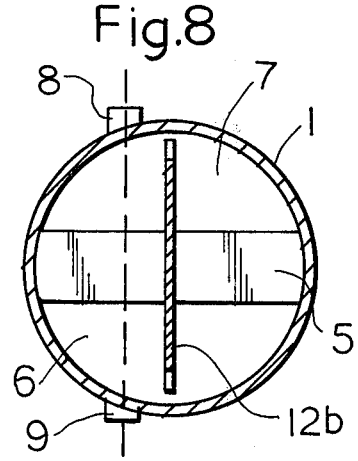
FIG. 10 is a cross section taken along the line X—X of FIG. 9.

A further embodiment is shown in FIGS. 9 and 10, in which the dividing wall 12b is of elliptical configuration, the large axis of which extends in the direction of the axis of the tube section 1, and the length of the small axis of which is smaller than the diameter of the tube section 1. In the embodiments illustrated in FIGS. 5-10, the dividing walls 12a or 12b are carried by the respective vortex generating body 5, which is fixedly connected at opposite ends to the inner surface of the respective tube section 1.

It will be understood that each of the elements described above, or two or more together, may also find a useful application in other types of flow meters in which a rod-shaped vortex generating body extends through a tube section through which the fluid stream to be measured passes in a direction transverse to the direction of the fluid stream, differing from the types described above.

While the invention has been illustrated and described as embodied in a flow meter of the aforementioned kind, especially for use in conduits of large diameter in which the conduit section in which the vortex generating body is provided is divided by at least one dividing wall into at least two vortex chambers through which the vortex generating body extends, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. In a flow meter, especially for measuring fluid flow passing through large-diameter tubular conduits, the tubular conduit having a longitudinal axis and a central section plane extending through said axis, a combination comprising a rod-shaped vortex generating body from which Karman vortices detach when fluid flow passes through the conduit, the frequency of vortices corresponding to the speed of the fluid flow through the conduit, said body having a longitudinal axis; a thin dividing wall extending through said central section plane and dividing said conduit into at least two vortex chambers, said dividing wall extending in said conduit normal to the longitudinal axis of said body so that two substantially separated vortices are respectively generated in said chambers, which vortices are detached from said body without mutual interaction with each other; and feeler means for measuring the frequency of said Karman vortices.

2. A combination as defined in claim 1, wherein said feeler means are coordinated only with one of said vortex chambers.

3. A combination as defined in claim 1, wherein said at least one dividing wall is constituted by a planar rectangular metal disk fixedly connected at opposite edges to the inner surface of the conduit, and wherein said vortex generating body extends to opposite sides of said disk through the medium region of the latter.

4. A combination as defined in claim 1, wherein said rod-shaped vortex generating body has a T-shaped cross section.

5. A combination as defined in claim 1, wherein said body extends in said conduit substantially symmetrically relative to said dividing wall.

6. In a flow meter, especially for measuring fluid flow passing through large-diameter tubular conduits, the tubular conduit having a longitudinal axis and a central section plane extending through said axis, a combination comprising a rod-shaped vortex generating body from which Karman vortices detach when fluid flow passes through the conduit, the frequency of vortices corresponding to the speed of the fluid flow through the conduit, said body having a longitudinal axis; at least one thin dividing wall extending substantially in the region of said central section plane and dividing said conduit into at least two vortex chambers, said dividing wall extending in said conduit normal to the longitudinal axis of said body so that two substantially separated vortices are respectively generated in said chambers, which vortices are detached from said body without mutual interaction with each other, said dividing wall being constituted by a planar rectangular metal disk having a height smaller than the diameter of the conduit and connected at a middle region thereof to said vortex generating body with the outer ends of the latter fixed to the inner surface of the conduit; and feeler means for measuring the frequency of said Karman vortices.

7. A combination as defined in claim 6, wherein a plurality of substantially parallel transversely spaced dividing walls are provided in the conduit section.

8. In a flow meter, especially for measuring fluid flow passing through large-diameter tubular conduits, the tubular conduit having a longitudinal axis and a central section plane extending through said axis, a combination comprising a rod-shaped vortex generating body from which Karman vortices detach when fluid flow passes through the conduit, the frequency of vortices corresponding to the speed of the fluid flow through the conduit, said body having a longitudinal axis; at least one thin dividing wall extending substantially in the region of said central section plane and dividing said conduit into at least two vortex chambers, said dividing wall extending in said conduit normal to the longitudinal axis of said body so that two substantially separated vortices are respectively generated in said chambers, which vortices are detached from said body without mutual interaction with each other, said dividing wall being constituted by a planar elliptical metal disk having a large axis extending in axial direction of the conduit and a small axis of a length smaller than the diameter of the conduit, said disk being connected at the middle region thereof to said vortex generating body with the outer ends of the latter fixed to the inner surface of the conduit; and feeler means for measuring the frequency of said Karman vortices.

9. In a flow meter, especially for measuring fluid flow passing through large-diameter tubular conduits, the tubular conduit having a longitudinal axis and a central section plane extending through said axis, a combination comprising a rod-shaped vortex generating body from which Karman vortices detach when fluid flow passes through the conduit, the frequency of vortices corresponding to the speed of the fluid flow through the conduit, said body having a longitudinal axis; at least one thin dividing wall extending substantially in the region of said central section plane and dividing said conduit into at least two vortex chambers, said dividing wall extending in said conduit normal to the longitudinal axis of said body so that two substantially separated vortices are respectively generated in said chambers, which vortices are detached from said body without mutual interaction with each other, said dividing wall being constituted by a planar circular metal disk having a diameter smaller than that of the conduit and being arranged in a plane including the axis of the latter, said disk being connected in a center region thereof to said vortex generating body with the outer ends of the latter fixed to the inner surface of the conduit; and feeler means for measuring the frequency of said Karman vortices.

* * * * *